May 5, 1953 F. W. CUNNINGHAM 2,637,848
RADIO NAVIGATION APPARATUS
Filed May 1, 1951 3 Sheets-Sheet 1

*INVENTOR.*
FREDERICK W. CUNNINGHAM
BY
Campbell Brumbaugh Free + Graves
his ATTORNEYS.

FIG. 5

INVENTOR.
FREDERICK W. CUNNINGHAM

May 5, 1953 F. W. CUNNINGHAM 2,637,848
RADIO NAVIGATION APPARATUS
Filed May 1, 1951 3 Sheets-Sheet 3

INVENTOR.
FREDERICK W. CUNNINGHAM
BY
his ATTORNEYS.

Patented May 5, 1953

2,637,848

UNITED STATES PATENT OFFICE 2,637,848

RADIO NAVIGATION APPARATUS

Frederick W. Cunningham, Stamford, Conn., assignor to Arma Corporation, Brooklyn, N. Y., a corporation of New York Application May 1, 1951, Serial No. 223,968

20 Claims. (Cl. 343—112)

This invention relates to navigation apparatus, and has particular reference to apparatus which automatically tunes a radio receiver on a moving craft to the frequency of a stationary transmitter shown on a map of the surroundings of the transmitter and on which the transmitter is located at the center of the map.

It is common practice in aerial navigation to utilize a series of maps of the route being traversed in conjunction with the omni-bearing-distance navigation system wherein transmitting stations are scattered throughout the country, separated by no more than one hundred miles, at precisely located positions. These transmitters continuously send out their omni-bearing signal at the distinctive frequency of one of the sixty-four channels which have been allotted for this purpose. When the pilot of an aircraft desires to check his location, his bearing receiver is tuned to the frequency of the nearest OBD transmitter, and the receiver translates the received bearing signal into voltages which denote the true bearing of the aircraft from the transmitter. The distance of the aircraft from the OBD station is determined by the time elapsed between a signal pulse transmitted from the aircraft to the OBD station and a responsive signal pulse transmitted by the OBD station which is received at the aircraft. The output of the distance measuring apparatus is in the form of a voltage whose magnitude is proportional to the distance of the aircraft from the OBD station. Although it is apparent from the foregoing that the bearing and distance determining equipment is not a simple receiver the term OBD receiver as used in the following description will be understood to include both bearing and distance receiving and determining apparatus. During continuous tracking of the flight, the receiver must be quickly tuned to a new frequency as the aircraft enters the field of a different transmitter, and the next map showing the terrain surrounding the new transmitter must be made immediately available to the navigator. Under present day conditions of the considerable distances traversed and speed of flight, a map constructed to a scale of eight miles to the inch must be changed rather frequently, and during a long flight presents problems of storage and accessibility.

In accordance with the present invention, navigation apparatus is provided in which one large map of the entire route, or at most a very few maps, bearing markings of all or many of the OBD transmitting stations along the route all used in conjunction with mechanism for tuning of OBD receiver to the succeeding transmitting stations and afford rapid and automatic tracking without the necessity of changing maps or materially interrupting the functioning of the receiver.

In a preferred embodiment of this invention, the map is made transparent and is mounted in one half of a rigid frame, the other half of the frame being a solid plate. The map is preferably capable of magnification of approximately twenty times so that a large area of terrain may be contained on one small size map, thereby keeping the required storage space for the maps at a minimum. Each transmitter location is marked on the map, and a hole is provided in the plate at a point corresponding to each transmitter and each hole has a depth corresponding to the known frequency of the transmitted signal. The map is projected on a screen and oriented so that the image of a transmitter near the craft is in the center of the screen, whereupon a locating pin is seated in the hole corresponding to that transmitter. The locating pin carries an electrical pickup device responsive to the axial position of the pin as determined by the depth of the hole and energizes a motor which rotates through an angle corresponding to the frequency of the transmitted signal to automatically tune the OBD receiver to the transmitted signal of the desired transmitter. The receiver output signals corresponding to bearing and distance of the craft from the transmitter also are used to position the center of a reticle on the projected map at a position corresponding to the true position of the craft with respect to the terrain shown on the map, so that the position of the reticle directly indicates the bearing and scale distance of a transmitter or any other point shown on the map with respect to the craft.

In a modification of this invention, the surroundings of each OBD transmitter are printed on an individual frame of a film strip, with the transmitter shown in the center of the frame and the frequency of the transmitter identified by a combination of transparent and opaque spots. Light passing through the transparent spots causes corresponding photoelectric cells to actuate associated relay-controlled switches, while the photoelectric cell corresponding to the opaque spots does not respond and the associated relay controlled switches remain in their normal position. The combination of normally-positioned and actuated switches connects selected voltage supplies in series to produce a voltage which corresponds to the transmitter frequency and which is matched against the output voltage of a potentiometer. In the matched condition the displacement of the brush of the potentiometer, driven by a servo motor to the matching position, corresponds to the transmitted frequency. The servo motor also drives the tuning control of the OBD receiver to thereby automatically tune the receiver to the desired frequency.

It will be seen that the navigation apparatus of this invention, while utilizing the OBD signal system now in use, facilitates that use and eliminates or materially reduces the delay, map storage requirements and sources of possible error which attend the current practice, and at the same time simplifies and renders navigation more accurate over long routes and during inclement weather.

For a more complete understanding of the invention, reference may be had to the accompanying diagrams in which.

Figure 1:
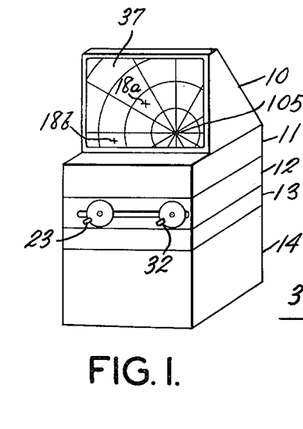
Figure 1 is a perspective view of the general exterior arrangement of an embodiment of the navigation apparatus of the invention.

Referring particularly to Figure 1, it will be observed that the navigation apparatus lends itself to division into component units 10, 11, 12 and 13 which may be conveniently stacked one on top of another in the order named, this stack of units being supported on a suitable base 14.

The unit 12 is the map carrier, wherein the map of the area to be traversed is embodied in or is mounted on transparency 15 so that the map is clearly delineated when transparency 15 is illuminated from the rear. As shown in Figure 3, the transparent map 15 is mounted in one half of a rigid frame 16, the other half of which carries a solid metal plate 17. The map 15 is accurately prepared and so oriented in frame 16 that longitude lies parallel to one side of frame 16, whereby true north is towards the top of the map 15 as projected in Figs. 1 and 2, and the relative locations of the OBD transmitting stations are marked by crosses 18, 18a, 18b, etc.

At each point on plate 17 accurately corresponding to each station cross 18 on map 15 a vertical hole 19 is bored to a relative depth corresponding to the signal frequency of the OBD transmitter represented by that particular cross 18. Thus, holes 19, 19a, 19b, etc. in plate 17 correspond in position and depth to the respective geographic locations and frequencies of the OBD transmitting stations 18, 18a, 18b, etc. respectively, shown on map 15, as is indicated in Fig. 3.

The frame 16 is inserted between arms 20 of the C-shaped frame 21, wherein the maps may be changed simply by substituting one complete frame 16, including map 15 and plate 17, for another frame 16. As shown particularly in Fig. 2, the frame 21 is supported on a plate 22 and its position in the "north-south" direction may be adjusted by turning crank handle 23 mounted on a shaft 24, journaled in bearing blocks 25, 26 of plate 22 and driving the pinion 27 meshing with rack 24 on C frame 21. Frame 21 is guided by the groove 29 in the surface of a plate 22, into which the downturned edge of frame 21 extends like a key.

Similarly, the plate 22 is supported in channels 30 and 31 at the back and front respectively of the map carrier unit 12, and its position in the "east-west" direction may be adjusted by turning crank handle 32 mounted on shaft 33 journalled in block 34 on plate 22. Shaft 33 carries pinion 35 which meshes with rack 36 secured to the front channel 31, so that pinion 35 travels along rack 36 to move plate 22 to the right or left, as seen in Fig. 3. Thus, map 15 and complementary plate 17 are adjusted "north-south" by means of crank 23 and they are adjusted "east-west" by means of crank 32.

Figure 2:
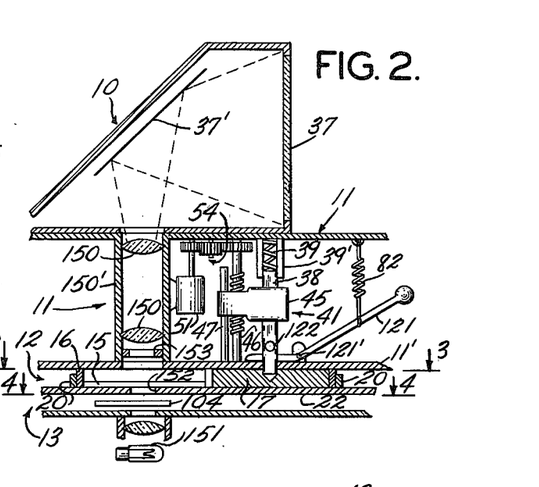
Figure 2 is a vertical section through the upper portion of the apparatus as seen along the line 2—2 of Figure 3 showing the map projecting system.
Figure 3:
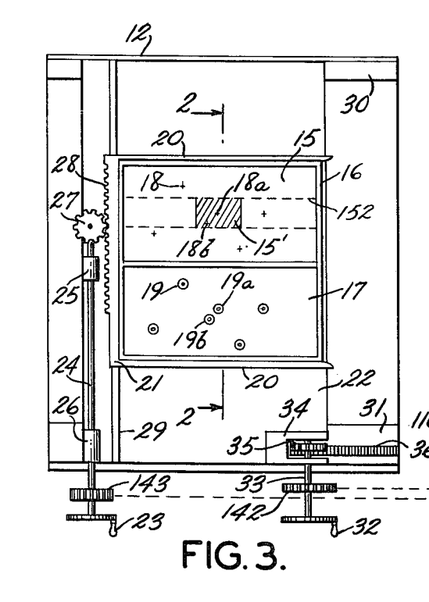
Figure 3 is a cross-sectional plan view of the map positioning unit, as seen along the line 3—3 of Figure 2.

Mounted upon the map carrier unit 12 is the control unit 11, which, among other things, carries the vertical locating pin 38 adapted to engage in one of the holes 19, 19a, 19b, etc., in plate 17, as is shown in Fig. 2. Preferably, the holes 19, 19a, 19b, etc., are tapered or cone-shaped at the bottom and the end of pin 38 is tapered or cone-shaped to fit. Locating pin 38 is slidably guided at its lower end in an opening through the bottom plate 11' of unit 11 and in a tubular guide 39' at its upper end, and is normally urged downwardly by spring 39. Locating pin 38 is manually retracted from plate 17 while adjusting frame 16, by means of forked lever 121, which is pivoted at 121' on bottom plate 11' of control unit 11 and is adapted to engage cross pin 122 and lift pin 38 when the free end of lever 121 is depressed against spring 82.

Also mounted in control unit 11 is the vertical image tube 150' containing the lens system 150 for focusing a light beam from a lamp 151 in base 14 through opening 152 in plate 22 and rectangular framing device 153 upon a reflector 37' mounted at an angle of 45° in the screen case 10. The vertical front face of screen case 10 is provided with the translucent screen 37 of ground glass, plastic sheeting or cloth, upon the rear face of which the image reflected by 37' is projected, as is indicated in Fig. 2.

When the map frame 16 is in position on plate 22, the light beam from source 151 is projected therethrough and the map image appears on screen 37, as indicated in Fig. 1. The portion of the map having station cross 18a at its center is shaded in the shape of a rectangle 15' (Fig. 3) having the proportions and orientation of the rectangular opening of framing device 152. In order to position map 15 so that the image of station cross 18a is projected on the center of screen 37, the map 15 is adjusted under the lenses 150 with crank handles 23 and 32 until the image of the shaded area 15' thereof is centered in framing device 152 which places the image cross 18a near the center of the screen 37.

While so adjusting map frame 16, the locating pin 38 in the control unit 11 is held retracted by lever 121, and when the adjustment is made, pin 38 is released and is firmly seated by spring 39 in the hole 19a in plate 17 corresponding to the cross 18a, as is shown in Fig. 2. The taper of the pin 38 and hole 19a, the small backlash in frame 16 adjusting means, and the pressure of spring 39 cooperate to enable the pin 38 to urge the frame 16 laterally to the position where the image cross 18a is exactly centered on screen 37.

Figure 5:
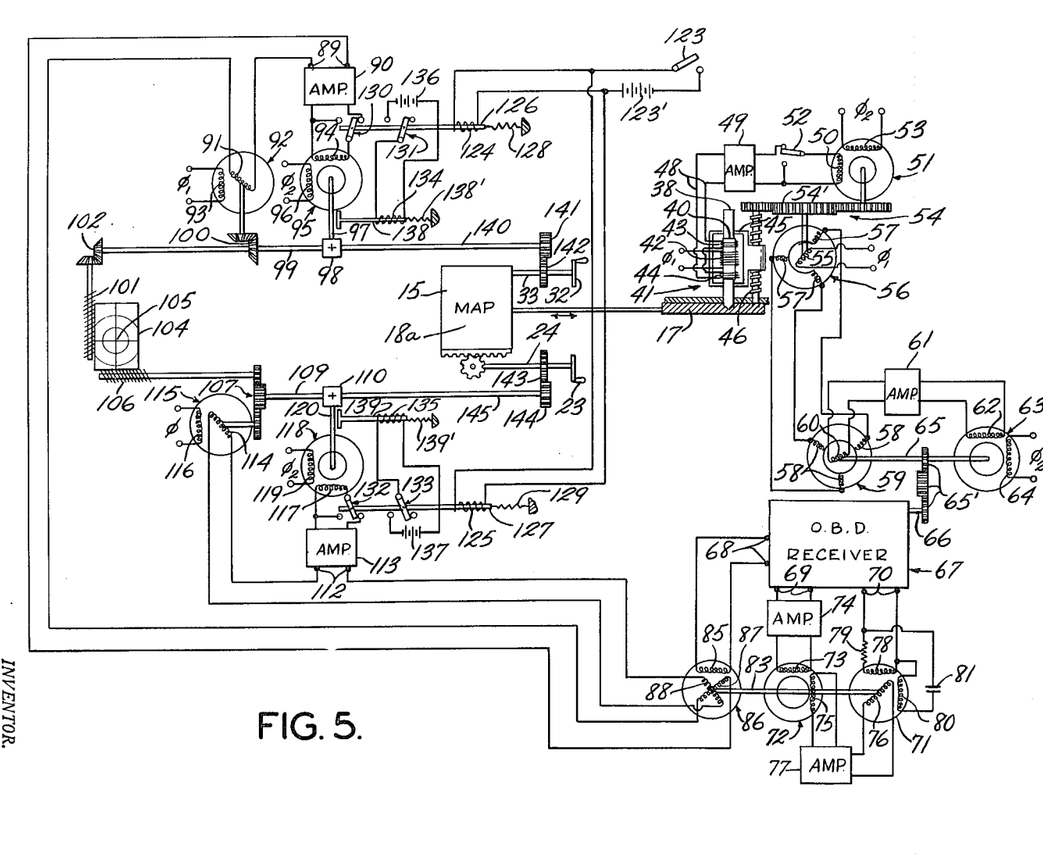
Figure 5 is a schematic wiring diagram of the navigation apparatus of this invention.

Locating pin 38 fixedly carries the magnetic armature 40 of a rectilinear pickup device 41 of the differential transformer type, shown schematically in Fig. 5. The primary winding 42 and secondary windings 43 and 44 of pickup device 41 are carried by the casing 45, with respect to which the locating pin 38 and the armature 40 are axially movable. The primary winding 42 of the pickup device 41 is energized by phase one ($\phi_1$) of a suitable two-phase source, while the secondary windings 43 and 44 are connected in series opposition across the output leads 48. The secondary windings 43 and 44 are inductively coupled to the primary winding 42 and comprise a pair of windings mounted concentrically and symmetrically with respect to the primary winding 42. The armature 40 is a magnetizable cylinder having a length approximating that of the primary winding 42, so that in effect the windings 42, 43 and 44 together with the armature 40 constitute a transformer having an adjustable core or armature 40. Accordingly, since the armature 40 is carried by pin 38, any relative displacement between pin 38 and casing 45, produces an output voltage across leads 48, whose magnitude is dependent on the magnitude of the relative displacement of the center of the armature 40 from the centers of windings 42, 43 and 44 and whose phase is dependent on the direction of such relative displacement. Casing 45 is guided for axial movement relative to locating pin 38 on guide rod 47 mounted on bottom plate 11. The lead screw 46 is threaded in casing 45 so that rotation of the lead screw 46 causes casing 45 to be driven vertically along the guide rod 47, thereby adjusting the axial position of the windings 42, 43, 44 along the armature 40 on pin 38.

The output leads 48 of pickup device 41 are connected to the input of a conventional electronic amplifier 49, the output voltage of which energizes control field winding 50 of motor 51 through closed switch 52. The main field winding 53 of motor 51 is energized by $\phi_2$ so that motor 51 drives lead screw 46 through the gearing 54 until the windings 43, 44 are centered with respect to the armature 40, whereby the output voltage of the pickup device 41 becomes zero and motor 51 is deenergized. When motor 51 is in the deenergized state, the lead screw 46 is angularly displaced from the zero position by an amount proportional to the displacement of armature 40 from its zero position, which in turn accords with the depth of hole 19a. Since the depth of hole 19a was made to correspond to the frequency of the signal of the OBD transmitter located at the position corresponding to cross 18a on map 15, it follows that the angular displacement of the lead screw 46 corresponds to the frequency of the signal transmitted by that OBD station.

The rotor winding 55 of self-synchronous generator 56 is driven by gear 54' of the gear train 54 and is energized by $\phi_1$, thereby inducing position signals in the stator windings 57 corresponding to the signal frequency of transmitter 18a. The stator windings 57 are electrically connected to corresponding stator windings 58 of self-synchronous control transformer 59, the rotor winding 60 of which is electrically connected to the input of conventional electronic amplifier 61 and is mechanically driven by shaft 65 of motor 63. The output of the amplifier 61 energizes control field winding 62 of motor 63, whose main field winding 64 is energized by $\phi_2$, so that motor 63 drives the rotor winding 60 to the non-inductive position. Hence, the angular displacement of shaft 65 of motor 63 corresponds to the position signals at stator windings 58, i. e., to the frequency of the signal transmitted by the transmitter at 18a. Shaft 65 is connected by gears 65' to the tuning control 66 of the OBD receiver 67, so that the receiver 67 is tuned to the frequency of the transmitter at 18a.

Although the OBD receiver 67 is indicated in Fig. 5 as a single receiver with outputs at terminals 68, 69 and 70, the receiver may comprise two distinct sections, one a distance measuring device and the other a bearing indicator, both of which would be tuned to the correct frequency by the motor 63. Such apparatus is well known and details of the bearing indicator section may be had upon reference to Federal Airways Manual of Operations IV-B-1-3, "Description and Theory of VHF Omniranges," first edition, published October 15, 1948, by the Civil Aeronautics Administration, and details of the distance measuring device section may be had upon reference to Bulletin No. 4, "Distance Measuring Equipment and Offset Course Computer," second edition, published August 1950 by the Civil Aeronautics Administration. Whether or not the OBD receiver 67 is arranged as a single unit or as two sections, the output voltage at receiver terminals 68 is proportional in magnitude to the ground distance of the craft from the transmitter at 18a, while the phase difference between the output voltages at terminals 69 and 70 is proportional to the bearing of the craft from the transmitter at 18a.

The phase difference between the output voltages at terminals 69 and 70 may be determined by induction resolver 71 in conjunction with the two-phase motor 72 rotating the rotor winding 76 of resolver 71 in the manner shown in Fig. 5. The voltage at terminals 69, amplified at 74, energizes one field winding 73 of motor 72 while the other field winding 75 of motor 72 is energized by the output of rotor winding 76 of resolver 71, which is connected to the winding 75 through amplifier 77. The signal at terminals 70 energizes stator winding 78 of resolver 71 through resistor 79, and also energizes stator winding 80 of resolver 71 through condenser 81. The resistor 79 and condenser 81 form a phase-splitting network which functions so that the stator windings 78 and 80 are energized by voltages which are in time quadrature although equal in magnitude, thus producing a rotating magnetic field in which the rotor winding 76 of resolver 71 is adapted to be rotated by motor 72. Accordingly, the phase of the output voltage of rotor winding 76 varies in accordance with the angular displacement of the rotor winding 76 from its defined zero position.

Motor 72 drives shaft 83 carrying the rotor winding 76 until the voltages energizing the field windings 73 and 75 of motor 72 are exactly in phase, whereupon the motor 72 is deenergized. The angular displacement of shaft 83 of motor 72 from its defined zero position corresponds to the phase difference between the signals at terminals 69 and 70, which is the equivalent of the bearing of the craft from the transmitter at 18a. The arrangement shown in Fig. 5 for determining the phase difference between the outputs at terminals 69 and 70 of receiver 67 is merely illustrative and other equivalent arrangements may be satisfactorily used, such as the modulator-demodulator circuits well known in the art, and the like.

The "distance" signal output of receiver 67 at terminals 68 is impressed on stator winding 85 of induction resolver 86, the rotor windings 87 and 88 of which are driven by shaft 83 of motor 72. Inasmuch as the magnitude of the voltage at stator winding 85 is proportional to the ground distance of the craft from the transmitter 18a, and the rotor windings 87 and 88 are angularly displaced according to the bearing of the craft from the transmitter, it follows that voltages induced in rotor windings 87 and 88 are respectively proportional in magnitude to the distance of the craft east and north of the transmitter 18a.

Rotor winding 87 of resolver 86 is connected in series with input terminals 89 of conventional electronic amplifier 90 and with rotor winding 91 of induction potentiometer 92, whose stator winding 93 is energized by $\phi_1$. Hence, the magnitude of the voltage at the input terminals 89 of amplifier 90 is the algebraic difference between the voltages induced in the rotor windings 87 and 91 of resolver 86 and potentiometer 92, respectively.

The output of amplifier 90 is connected to control field winding 94 of motor 95 through switch 130, while the main field winding 96 of motor 95 is energized by $\phi_2$. Motor 95 drives the input shaft 97 of mechanical differential 98, whose output shaft 99 drives the rotor winding 91 of potentiometer 92 through gearing 100, until the voltage induced in the rotor winding 91 matches the output voltage of rotor winding 87. Motor 95 is accordingly deenergized and the angular displacement of shaft 99 and rotor winding 91 from the defined zero position is proportional to the magnitude of the output voltage of rotor winding 87, which is equivalent to the distance of the craft east of the transmitter 18a. The other input of differential 98 is driven by east-west adjusting handle 32 through gears 141 and 142 and shaft 140.

Figure 4:
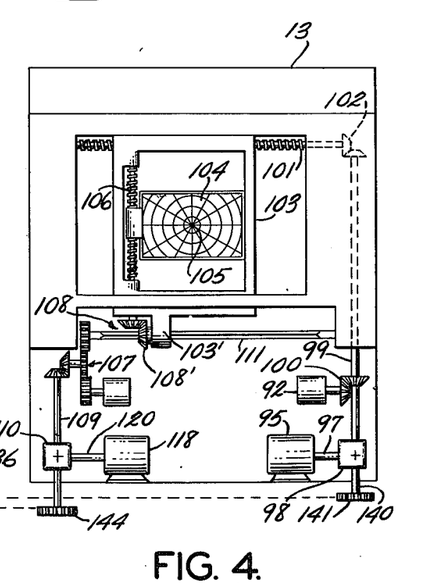
Figure 4 is a plan view of the reticle positioning unit as seen along the line 4—4 of Figure 2.

The output shaft 99 of differential 98 also drives lead screw 101 through gearing 102, and the lead screw 101 drives the reticle frame 103 in the east-west direction, i. e., to the right or left as seen in the enlarged detail of Fig. 4. The reticle 104 is located in frame 103 within reticle positioning unit 13 and is composed of a transparent material lined with a series of concentric circles and radial lines, the center 105 of which represents the subject aircraft. As shown in Fig. 2, the reticle 104 is positioned parallel to and immediately below the map 15 and is partly projected on screen 37 along with the map 15. In the defined zero position, the image of reticle center 105 is projected on the center of screen 37 and coincides with the projected image of station cross 18a, for example, so that when the shaft 99 is displaced according to the signal at rotor winding 87 of receiver resolver 86, the displacement of reticle center 105 to the right or left of the image of transmitter station cross 18a corresponds to the distance of the craft east of the transmitter at station 18a.

The second rotor winding 88 of resolver 86 is connected in series with input terminals 112 of conventional electronic amplifier 113 and with the rotor winding 114 of induction potentiometer 115, whose stator winding 116 is energized by $\phi_1$, so that the difference voltage of rotor windings 88 and 114 is applied to terminals 112 of amplifier 113. The output of amplifier 113 energizes control field winding 117 of motor 118, the main field winding 119 being energized by $\phi_2$, so that motor 118 drives the input shaft 120 of mechanical differential 110. The other input of differential 110 is driven by north-south adjusting handle 23 through gears 143 and 144 and shaft 145. The output shaft 109 of differential 110 drives rotor winding 114 of induction potentiometer 115 through gearing 107 until the voltage induced in rotor winding 114 matches the output of rotor winding 88, whereby the motor 118 is deenergized.

The output shaft 109 of mechanical differential 110 and gearing 107 also drives the lead screw 106 to adjust the reticle 104 in the north-south direction in reticle frame 153. As shown in Fig. 4, these connections are made through shaft 111 and gearing 108 of which gear 108' is journaled in an extension 103' of the frame 103, and is splined on square shaft 111, so that gear 108' is free to slide along shaft 111 as the reticle frame 103 is driven by lead screw 101. It will be seen that when motor 118 is deenergized, shaft 109 and lead screw 106 are angularly displaced from the zero position according to the signal at rotor winding 88 of receiver resolver 86, and reticle 104 is displaced in the north-south direction from the zero position by an amount proportional to the distance of the subject craft north of the transmitter at station 18a.

In operation of the navigation apparatus of this invention as shown in Figs. 1 to 5, and assuming that it is desired to display the next transmitter en route on map 15 at the center of screen 37, lever 121 is depressed to withdraw pin 38 from plate 17 to release the frame 21 so that it can be repositioned with plate 22 by means of the cranks 23 and 32. Before withdrawing the pin 38, it is desirable to actuate switch 52 to the position where control field winding 50 is short-circuited in order to preclude detuning of receiver 67.

Switch 123 is then closed to energize relay windings 124 and 125 from power supply 123' to cause them to draw the respective armatures 126 and 127 to the left against the action of springs 128 and 129, respectively, to engage switches 130, 131 and 132, 133 with the respective left-hand stationary contacts. Closure of switches 131 and 133 energizes the respective brake windings 134 and 135 from corresponding power sources 136 and 137 against springs 138' and 139' to apply corresponding brakes 138 and 139 to shafts 97 and 120 of motors 95 and 118, respectively. Simultaneously, switches 130 and 132 short-circuit the respective control field windings 94 and 117 of the braked motors 95 and 118.

Having retracted pin 38 and deenergized the control apparatus, the operator adjusts map 15 in the east-west direction by means of crank handle 32, pinion 35, rack 36 and map frame 16. Crank handle 32 also drives the input shaft 140 of mechanical differential 98 proportionally through gears 141 and 142. Since the other input shaft 97 of differential 98 is prevented from rotating by brake 138, the shaft 140 drives the output shaft 99 through mechanical differential 98 to rotate lead screw 101 and adjust the reticle 104 simultaneously with the map 15 to keep the reticle center 105 in the same relative position that it bore to the map 15 just before switch 123 was closed.

Similarly, when turning crank handle 23 to adjust the map 15 in the north-south direction by shaft 24, pinion 27 and rack 28, the displacement of shaft 24 also is transmitted to output shaft 109 of mechanical differential 110 through gears 143, 144 and input shaft 145 of the mechanical differential 110 to drive the lead screw 106 and reticle 104 in the north-south direction along the map 15. When the image of the next OBD transmitter station cross 18b is centered on screen 37, its position very nearly corresponds to the position of the subject craft over the terrain on the map 15, any slight discrepancy between the positions being due to the movement of the craft during the time that the adjustment of the map 15 to the new transmitting station 18b was taking place.

When map 15 has been adjusted to the desired position, the operator releases lever 121 which is returned to its normal position by spring 82, whereupon spring 39 urges pin 38 into the hole 19b whose position on plate 17 corresponds to the position of the transmitter station cross 18b on map 15. Switch 52 is then operated to apply the output of amplifier 49 to the control field winding 50 and thereby cause the OBD receiver 67 to be tuned to receive the signal of the transmitter located at station 18b. The east-west and north-south voltages of rotor windings 87 and 88 are very nearly matched by the potentiometer 92 and 115 output voltages, respectively, since the reticle 104 is very nearly correctly positioned, as previously described. Switch 123 is then opened, thereby simultaneously disengaging brakes 138 and 139 from respective shafts 97 and 120, and energizing the motors 95 and 118 to adjust the position of the reticle 104 by means of lead screws 101 and 106.

This adjustment is repeated each time that the shift to a new area on the map 15 is necessary as the subject aircraft or other vehicle reaches the signal zone of the next OBD or other signal station, all of which are spotted on the map 15, with the corresponding holes 19 in plate 17 having the relative depths according with their respective station frequencies.

Figure 6:
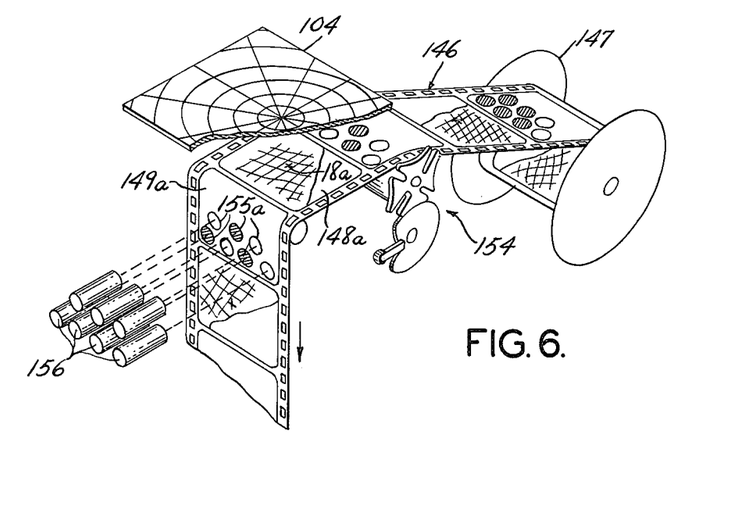
Figure 6 is a perspective view of the projection system of a modification of the invention.

Referring now to the modification shown in Fig. 6, the map is contained on film strip 146, such as 35 mm. film for example, which is supplied from reel 147 and taken up on a reel not shown. Each OBD transmitter and its surrounding area is shown on an individual frame, with the transmitter station positioned in the center of the frame in each case. For example, in Fig. 6, the transmitter station 18a is shown positioned in the center of the frame 148a which is exactly positioned under the lens system, not shown in Fig. 6, but like 150 in Fig. 2. This exact positioning and advance to the next frame is effected by the Geneva movement 154, which drives the film 146 between reel 147 and the take-up reel in a manner that is well understood and need not be described.

The frame 149a next adjacent to frame 148a is provided with a plurality of spots 155a, each of which may be either transparent or opaque, the particular combination of opaque and transparent spots 155a identifying the frequency of the transmitter corresponding to that represented by cross 18a on frame 148a. The light passing through the spots 155a, assuming them to be transparent, impinges on corresponding photoelectric tubes 156 located opposite each of the spots 155a. These photoelectric cells 156 control circuits which effect the tuning of the OBD receiver 67 to the transmitter on frame 148a in a manner to be described in connection with Fig. 7.

Seven spots 155a are shown in Fig. 6, this being the minimum number of spots which will produce along with the corresponding photoelectric systems, at least 64 different voltages corresponding to the 64 presently allotted OBD channels.

Figure 7:
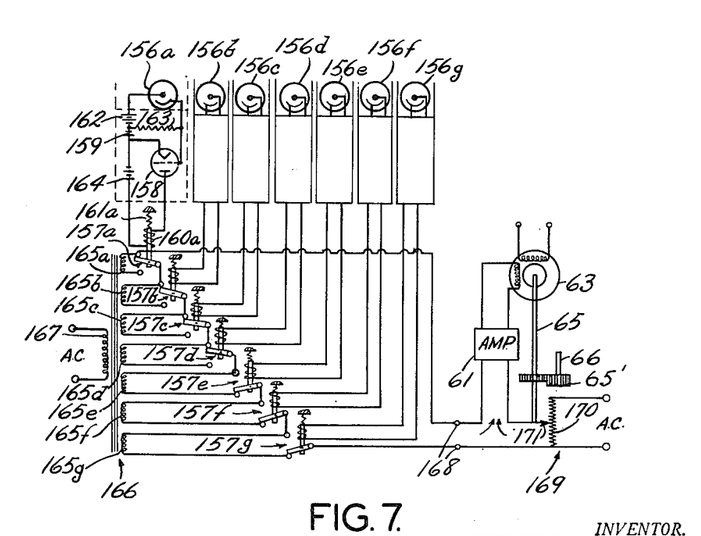
Figure 7 is a schematic wiring diagram, in part, of the modification shown in Figure 6.

Referring now to Fig. 7 in conjunction with Fig. 6, each of the photoelectric tubes 156a, 156b, 156c, 156d, 156e, 156f, and 156g diagrammatically there shown controls its corresponding relay operated switch 157a, 157b, 157c, 157d, 157e, 157f, and 157g, respectively. Thus, when photoelectric tube 156a is dark, the electronic tube 158 is biased beyond cut-off by the voltage of power supply 159, so that relay winding 160a remains deenergized and the switch 157a is urged upwardly by spring 161a to engage the upper contact. When photoelectric tube 156a is excited by light passing through one of the transparent spots 155a, a circuit is completed from power supply 162 through resistor 163, causing the grid bias of tube 158 to be decreased by the voltage across resistor 163 so that tube 158 conducts. Relay winding 160a is therefore energized by power supply 164 to actuate switch 157a downwardly to engage lower fixed contact against the action of spring 161a.

The stationary contacts of each of the switches 157a, 157b, 157c, 157d, 157e, 157f and 157g are connected across respective secondary windings 165a, 165b, 165c, 165d, 165e, 165f and 165g of transformer 166, whose primary winding 167 is energized by a constant alternating current voltage supply. Because of the connections shown, switch 157a is normally connected to the upper stationary contact of switch 157b, switch 157b is normally connected to the upper stationary contact of switch 157c, and so on, for each of the switches.

In operation of the modification of the navigation system of this invention as shown by Figs. 6 and 7, it will be seen that a voltage is produced between the upper stationary contact of switch 157a and switch 157g. The magnitude of this voltage is determined by the position of the switches 157a, 157b, 157c, 157d, 157e, 157f and 157g, as well as by the output voltages of the secondary windings 165a, 165b, 165c, 165d, 165e, 165f, and 165g, i. e., the magnitude of the voltage between 157a and 157g depends upon the particular number and arrangement of transparent and opaque spots 155a on frame 149a. This voltage therefore corresponds to the frequency of the transmitter on frame 148a, and is applied to terminals 168. Terminals 168 are connected in series with the input to conventional electronic amplifier 61 and the output of potentiometer 169, the winding 170 of which is energized by a constant alternating current voltage. The output of amplifier 61 energizes motor 63, which therefore drives shaft 65 and the movable contact 171 of potentiometer 169 until the output of potentiometer 169 matches the voltage at terminals 168, and the angular position of shaft 65 corresponds to the frequency of the transmitter 18a on frame 148a.

As in the arrangement of Fig. 5, shaft 65 drives the tuning control 66 of receiver 67 through gearing 65' to receive the signal of the transmitter located at station 18a, while the reticle 104, shown mounted above the frame 148a in Fig. 6, is driven directly by motors 95 and 118. The corresponding differentials 98 and 110 shown in Fig. 5 are not required here, since the frame 16 and its associated drive cranks 23 and 32 are not used in this modification. In the arrangement of Fig. 6, the reticle center 105 must be driven to the correct position by the motors 95 and 118 whenever a new frame of film strip 146 is projected, since the reticle 104 cannot be "frozen" to the transmitter during change of transmitters on the screen, as occurs in the arrangement of Fig. 5.

It is evident that the switches 157 in Fig. 7 may be controlled by means other than photoelectric re-lays which are excited by light and dark spots. For example, when the film strip 146 is in color, the color sensitive photoelectric tubes 156 may be controlled by a varicolored strip on the edge of the film 146. Alternatively, notches may be cut in the edge of the film strip 146 for controlling either switches 157 or the relays 160 directly, the fingers which sense the notches being withdrawn when the film strip 146 is in motion.

Other changes and variations may be made, it being understood that the invention is not limited to the particular arrangements illustrated and described herein, except by the scope of the appended claims.

I claim:

1. In navigation apparatus for dirigible craft utilizing a radio receiver having a tuning control for tuning the same to one of a series of fixed transmitters spaced along the route of the craft and each emitting a signal which is characteristic of that transmitter, the combination of a plate-like movable element on said craft having indicated thereon the relative location of at least one of the several transmitters, a second plate-like element connected to and movable with said first element and having means representing the signal characteristic of at least said one transmitter, means responsive to the signal characteristic representing means of said second element upon cooperation therewith, mechanism for simultaneously moving said elements to position the said signal characteristic representing means of said second plate-like element into cooperative relation with said responsive means, electrical control means energized in accordance with the response of said responsive means, motive means controlled by said electrical control means, and operative connections between said motive means and the tuning control of said receiver.

2. In navigation apparatus for dirigible craft utilizing a radio receiver having a tuning control for tuning the same to one of a series of fixed transmitters spaced along the route of the craft and each emitting a signal which is characteristic of that transmitter, the combination of a plate-like movable element on said craft having indicated thereon the relative location of at least one of the several transmitters, a second plate-like element connected to and movable with said first element and having means representing the signal characteristic of at least said one transmitter, relatively fixed means responsive to the signal characteristic representing means of said second element upon cooperation therewith, mechanism for moving said second element in a plane substantially normal to said responsive means to position said signal characteristic representing means into cooperative relation with said responsive means, electrical control means energized in accordance with the response of said responsive means, motive means controlled by said electrical control means, and operative connections between said motive means and the tuning control of said receiver.

3. In navigation apparatus for dirigible craft utilizing a radio receiver having a tuning control for tuning the same to one of a series of fixed transmitters spaced along the route of the craft and each emitting a signal which is characteristic of that transmitter, the combination of a viewing screen on said craft, a source of light, a transparent plate-like movable element interposed between said source and screen and having indicated thereon the relative location of at least one of the several transmitters, a second plate-like element connected to and movable with said first element and having means representing the signal characteristic of at least said one transmitter, means responsive to the signal characteristic representing means of said second element upon cooperation therewith, mechanism for simultaneously moving said elements to predeterminately position the projected image of the transmitter indication of said first element on said screen and thereby position the corresponding representing means of said second element into cooperative relation with said responsive means, electrical control means energized in accordance with the response of said responsive means, motive means controlled by said electrical control means, and operative connections between said motive means and the tuning control of said receiver.

4. In navigation apparatus for dirigible craft utilizing a radio receiver having a tuning control for tuning the same to one of a series of fixed transmitters spaced along the route of the craft and each emitting a signal which is characteristic of that transmitter, the combination of a viewing screen on said craft, a source of light, a movable reticle interposed between said source and screen and representing the relative position of the craft, a transparent plate-like movable element also interposed between said source and screen and having indicated thereon the relative location of at least one of the several transmitters, a second plate-like element connected to and movable with said first element and having means representing the signal characteristic of at least said one transmitter, means responsive to the signal characteristic representing means of said second element upon cooperation therewith, mechanism for simultaneously moving said elements to predeterminately position the projected image of the transmitter indication of said first element on said screen and thereby position the corresponding signal characteristic representing means of said second element into cooperative relation with said responsive means, electrical control means energized in accordance with the response of said responsive means, motive means controlled by said electrical control means, operative connections between said motive means and the tuning control of said receiver, second motive means included in said mechanism, operative connections between said second motive means and said reticle for moving the same, and means interposed in said last-named connections and responsive to the signal received by said receiver for adjusting the position of the projected image of said reticle on said screen relatively to the projected image of said transmitter indication in accordance with the distance and direction of the craft from said transmitter.

5. In navigation apparatus for dirigible craft utilizing a radio receiver having a tuning control for tuning the same to one of a series of fixed transmitters spaced along the route of the craft and each emitting a signal which is characteristic of that transmitter, the combination of a viewing screen on said craft, a source of light, a transparent plate-like movable element interposed between said source and screen and having indicated thereon the relative location of at least one of the several transmitters, a second plate-like element connected to and movable with said first element and having means representing the signal characteristic of at least said one transmitter, relatively fixed means responsive to the signal characteristic representing means of said second element upon cooperation therewith, mechanism for simultaneously moving said elements with said second element lying in a plane substantially normal to said responsive means to predeterminately position the projected image of the transmitter indication of said first element on said screen and thereby position the corresponding signal characteristic representing means of said second element into cooperation relative with said responsive means, electrical control means energized in accordance with the response of said responsive means, motive means controlled by said electrical control means, and operative connections between said motive means and the tuning control of said receiver.

6. In navigation apparatus for dirigible craft utilizing a radio receiver having a tuning control for tuning the same to one of a series of fixed transmitters spaced along the route of the craft and each emitting a signal which is characteristic of that transmitter, the combination of a viewing screen on said craft, a source of light, a movable reticle interposed between said source and screen and representing the craft, a transparent plate-like movable element also interposed between said source and screen and having indicated thereon the relative location of at least one of the several transmitters, a second plate-like element connected to and movable with said first element and having means representing the signal characteristic of at least said one transmitter, relatively fixed means responsive to the signal characteristic representing means of said second element upon cooperation therewith, mechanism for simultaneously moving said elements with at least said second element lying in a plane substantially normal to said responsive means to predeterminately position the projected image of the transmitter indication of said first element on said screen and thereby position the corresponding signal characteristic representing means of said second element into cooperative relation with said responsive means, electrical control means energized in accordance with the response of said responsive means, motive means controlled by said electrical control means, operative connections between said motive means and the tuning control of said receiver, second motive means included in said mechanism, operative connections between said second motive means and said reticle for moving the same, and means interposed in said last-named connections and responsive to the signal received by said receiver for adjusting the position of the projected image of said reticle on the screen relatively to the projected image of said transmitter indication in accordance with the distance and direction of the craft from said transmitter.

7. In navigation apparatus for dirigible craft utilizing a radio receiver having a tuning control for tuning the same to one of a series of fixed transmitters spaced along the route of the craft and each emitting a signal which is characteristic of that transmitter, the combination of means on said craft representing and positioned at the relative locations of the several transmitters and each having a dimension according with the signal characteristic of the corresponding transmitter, a member adapted to be positioned by each of said means in accordance with the dimension thereof conforming to the signal characteristic of the transmitter which said means represents, electrical control means responsive to the position of said member, motive means controlled by said last-named means, and operative connections between said motive means and the tuning control of said receiver.

8. In navigation apparatus for dirigible craft utilizing a radio receiver having a tuning control for tuning the same to one of a series of fixed transmitters spaced along the route of the craft and each emitting a signal which is characteristic of that transmitter, the combination of a reference surface on said craft having indicated thereon the relative locations of the several transmitters, means at each of said indicated transmitter locations on said surface having a dimension according with the signal characteristic of the corresponding transmitter, a member adapted to be positioned by each of said means in accordance with the dimension thereof conforming to the signal characteristic of the transmitter which said means represents, electrical control means responsive to the position of said member, motive means controlled by said last-named means, and operative connections between said motive means and the tuning control of said receiver.

9. In navigation apparatus for dirigible craft utilizing a radio receiver having a tuning control for tuning the same to one of a series of fixed transmitters spaced along the route of the craft and each emitting a signal which is characteristic of that transmitter, the combination of a map on said craft having indicated thereon the relative locations of the several transmitters, means at locations corresponding to each of said indicated transmitter locations on said map and each having a dimension according with the signal characteristic of the corresponding transmitter, a member adapted to be positioned by each said means in accordance with the dimension thereof conforming to the signal characteristic of the transmitter which said means represents, electrical control means responsive to the position of said member, motive means controlled by said last-named means, and operative connections between said motive means and the tuning control of said receiver.

10. In navigation apparatus for dirigible craft utilizing a radio receiver having a tuning control for tuning the same to one of a series of fixed transmitters spaced along the route of the craft and each emitting a signal which is characteristic of that transmitter, the combination of a map on said craft having indicated thereon the relative locations of the several transmitters, a plate adjacent said map, means on said plate at locations corresponding to each of said indicated transmitter locations on said map and each having a dimension according with the signal characteristic of the corresponding transmitter, a member adapted to be positioned by each of said means in accordance with the dimensions thereof conforming to the signal characteristic of the transmitter which said means represents, electrical control means responsive to the position of said member, motive means controlled by said last-named means, and operative connections between said motive means and the tuning control of said receiver.

11. In navigation apparatus for dirigible craft utilizing a radio receiver having a tuning control for tuning the same to one of a series of fixed transmitters spaced along the route of the craft and each emitting a signal which is characteristic of that transmitter, the combination of means on said craft representing and positioned at the relative locations of the several transmitters and each having a dimension according with the signal characteristic of the corresponding transmitter, a member adapted to be positioned by each of said means in accordance with the dimension thereof corresponding to the signal characteristic of the transmitter which said means represents, mechanism for bodily adjusting all of said means to selectively engage one of said means with said member for positioning the same, electrical control means responsive to the position of said member, motive means controlled by said last-named means, and operative connections between said motive means and the tuning control of said receiver.

12. In navigation apparatus for dirigible craft utilizing a radio receiver having a tuning control for tuning the same to one of a series of fixed transmitters spaced along the route of the craft and each emitting a signal which is characteristic of that transmitter, the combination of means forming a reference surface on said craft and having indicated thereon the relative locations of the several transmitters, means at each of said indicated transmitter locations on said surface forming means having a dimension according with the signal characteristic of the corresponding transmitter, a member adapted to be positioned by each of said dimensional means in accordance with the dimension thereof conforming to the signal characteristic of the transmitter which said dimensional means represents, mechanism for bodily adjusting all of said dimensional means to selectively engage one of them with said member for positioning the latter, electrical control means responsive to the position of said member, motive means controlled by said last-named means, and operative connections between said motive means and the tuning control of said receiver.

13. In navigation apparatus for dirigible craft utilizing a radio receiver having a tuning control for tuning the same to one of a series of fixed transmitters spaced along the route of the craft and each emitting a signal which is characteristic of that transmitter, the combination of a route map on said craft having indicated thereon the relative locations of the several transmitters, a plate adjacent said map, means on said plate at locations corresponding to transmitter locations on said map and each having a dimension according with the signal characteristic of the corresponding transmitter, a member adapted to be positioned by each of said means in accordance with the dimension thereof conforming to the signal characteristic of the transmitter which said means represents, mechanism for bodily adjusting all of said means to selectively engage one of said means with said member for positioning the same, electrical control means responsive to the position of said member, motive means controlled by said last-named means, and operative connections between said motive means and the tuning control of said receiver.

14. In navigation apparatus for dirigible craft utilizing a radio receiver having a tuning control for tuning the same to one of a series of fixed transmitters spaced along the route of the craft and each emitting a signal which is characteristic of that transmitter, the combination of a plate on said craft having sockets therein positioned at the relative locations of the several transmitters and each having a depth according with the signal characteristic of the corresponding transmitter, a member substantially normal to the surface of said plate and adapted to be positioned variably axially by each of said sockets in accordance with the signal characteristic of the transmitter which the corresponding socket represents, mechanism for bodily adjusting said plate in a direction substantially normal to the axis of said member to selectively align one of said sockets with said member for axially positioning the member in accordance with the depth of the aligned socket, electrical control means responsive to the axial position of said member, motive means controlled by said last-named means, and operative connections between said motive means and the tuning control of said receiver.

15. In navigation apparatus for dirigible craft utilizing a radio receiver having a tuning control for tuning the same to one of a series of fixed transmitters spaced along the route of the craft and each emitting a signal which is characteristic of that transmitter, the combination of a route map on said craft having indicated thereon the relative locations of the several transmitters, a plate adjacent said map, sockets on said plate at locations corresponding to transmitter locations on said map and each having a depth according with the signal characteristic of the corresponding transmitter, a member substantially normal to said plate and adapted to be positioned variably axially by each of said sockets in accordance with the signal characteristic of the transmitter which the corresponding socket represents, mechanism for bodily adjusting said map and plate in a direction substantially normal to the axis of said member to selectively align one of said sockets with said member for axially positioning the member in accordance with the depth of the aligned socket, electrical control means responsive to the axial position of said member, motive means controlled by said last-named means, and operative connections between said motive means and the tuning control of said receiver.

16. In navigation apparatus for dirigible craft utilizing a radio receiver having a tuning control for tuning the same to one of a series of fixed transmitters spaced along the route of the craft and each emitting a signal which is characteristic of that transmitter, the combination of a viewing screen on said craft, a source of light, a movable reticle interposed between said source and said screen and representing the craft, a transparent map also interposed between said source and said screen and having indicated thereon the relative locations of the several transmitters, means movable with said map and corresponding to each of said indicated transmitter locations on said map and each having a different dimension representing the signal characteristic of the corresponding transmitter, a member adapted to be positioned by each of said dimensional means in accordance with the signal characteristic which said means represents, mechanism for simultaneously moving said map and dimensional means to predeterminately position the projected image of a selected transmitter indication of said map on said screen and thereby engage the corresponding dimensional means with said member and correspondingly position the latter, electrical control means responsive to the position of said member, motive means controlled by said last-named means, operative connections between said motive means and the tuning control of said receiver, second motive means included in said mechanism, operative connections between said second motive means and said reticle for moving the same, and means interposed in said last-named connections and responsive to the signal received by said receiver for adjusting the position of the projected image of said reticle on the screen relative to the projected map of the said selected transmitter indication in accordance with the distance and direction of the craft from the said selected transmitter.

17. In navigation apparatus for dirigible craft utilizing a radio receiver having a tuning control for tuning the same to one of a series of fixed transmitters spaced along the route of the craft and each emitting a signal which is characteristic of that transmitter, the combination of a viewing screen on said craft, a source of light, a movable transparent frame interposed between said source and said screen and having indicated thereon the relative location of one of the several transmitters, a second frame connected to and movable with said first frame and having means thereon representing the signal characteristic of the said one transmitter, relatively fixed means responsive to the signal characteristic representing means of said second frame upon cooperation therewith, mechanism for simultaneously moving said frames to predeterminately position the projected image of said one transmitter indication of said first frame on said screen and thereby position said signal characteristic representing means of said second frame in cooperation with said responsive means, electrical control means energized by said responsive means, motive means controlled by said last-named means, and operative connections between said motive means and the tuning control of said receiver.

18. In navigation apparatus for dirigible craft utilizing a radio receiver having a tuning control for tuning the same to one of a series of fixed transmitters spaced along the route of the craft and each emitting a signal which is characteristic of that transmitter, the combination of a viewing screen on said craft, a source of light, a movable transparent strip interposed between said source and said screen, a series of spaced transparent frames on said strip each corresponding to one of the several transmitters, and having indicated thereon the relative location of one of the several transmitters, a second frame in the space between first frames on said strip and each corresponding to a first frame and having transparent means thereon representing the signal characteristic of the corresponding transmitter, relatively fixed photoelectric means responsive to the signal characteristic representing means of said second frame upon cooperation therewith, mechanism for simultaneously moving said frames to predeterminately position the projected image of said one transmitter indication of said first frame on said screen and thereby position said signal characteristic representing means of said second frame in cooperation with said responsive means, electrical control means energized by said responsive means, motive means controlled by said last-named means, and operative connections between said motive means and the tuning control of said receiver.

19. In navigation apparatus for dirigible craft utilizing a radio receiver having a tuning control for tuning the same to one of a series of fixed transmitters spaced along the route of the craft and each emitting a signal which is characteristic of that transmitter, the combination of a viewing screen on said craft, a source of light, a movable transparent strip interposed between said source and said screen, a series of spaced transparent frames on said strip each corresponding to one of the several transmitters, and having indicated thereon the relative location of one of the several tranmitters, a second frame in the space between first frames on said strip and each corresponding to a first frame and having transparent means thereon representing the signal characteristic of the corresponding transmitter, a plurality of relatively fixed photoelectric means responsive to the signal characteristic representing means of said second frame upon cooperation therewith, mechanism for simultaneously moving said frames to predeterminately position the projected image of said one transmitter indication of said first frame on said screen and thereby position said signal characteristic representing means of said second frame in cooperation with said responsive means, a plurality of electrical control means severally connected to and selectively energized by said responsive means, motive means controlled by said last-named means, and operative connections between said motive means and the tuning control of said receiver.

20. In navigation apparatus for dirigible craft utilizing a radio receiver having distance and bearing measuring portions and a tuning control for tuning the same to one of a series of fixed transmitters spaced along the route of the craft and each emitting a signal which is characteristic of that transmitter, the combination of a viewing screen on said craft, a source of light, a movable reticle interposed between said source and screen and representing the craft, a transparent plate-like movable element also interposed between said source and screen and having indicated thereon the relative location of at least one of the several transmitters, a second plate-like element connected to and movable with said first element and having means representing the signal characteristic of at least said one transmitter, relatively fixed means responsive to the signal characteristic representing means of said second element upon cooperation therewith, mechanism for simultaneously moving said elements with at least said second element lying in a plane substantially normal to said responsive means to predeterminately position the projected image of the transmitter indication of said first element on said screen and thereby position the corresponding signal characteristic representing means of said second element into cooperative relation with said responsive means, electrical control means energized in accordance with the response of said responsive means, motive means controlled by said last-named means, operative connections between said motive means and the tuning control of said receiver, operative connections between said mechanism and said reticle for simultaneously moving the same with said elements in two directions, motive means energized in accordance with the voltage output of the bearing measuring portion of said receiver, a transformer having a stator winding energized by the voltage output of the distance measuring portion of said receiver and a pair of rotor windings driven by said last-named motive means, two motive means respectively energized in accordance with the voltages induced in said rotor windings, and means interposed in said last-named connections and driven by said two last-named motive means for adjusting the position of said reticle in two directions to locate the projected image of the reticle on said screen relatively to the projected image of said transmitter indication in accordance with the distance and direction of the craft from said transmitter.

FREDERICK W. CUNNINGHAM.

References Cited in the file of this patent

UNITED STATES PATENTS

| Number | Name | Date |
| --- | --- | --- |
| 2,209,191 | Dearing | July 23, 1940 |
| 2,246,496 | Asbury | June 24, 1941 |
| 2,422,025 | Luck | June 10, 1947 |
| 2,468,045 | Deloraine | Apr. 26, 1949 |